United States Patent
Haas et al.

(10) Patent No.: US 11,458,578 B2
(45) Date of Patent: Oct. 4, 2022

(54) METHOD FOR THE LASER ALIGNMENT OF GUIDE RAILS

(71) Applicant: Robert Bosch GmbH, Stuttgart (DE)

(72) Inventors: Thomas Haas, Roethlein (DE); Horst Scharfenberger, Hammelburg (DE); Sascha Fuhrmann, Waigolshausen (DE)

(73) Assignee: Robert Bosch GmbH, Stuttgart (DE)

(*) Notice: Subject to any disclaimer, the term of this patent is extended or adjusted under 35 U.S.C. 154(b) by 211 days.

(21) Appl. No.: 16/929,532

(22) Filed: Jul. 15, 2020

(65) Prior Publication Data

US 2021/0031314 A1 Feb. 4, 2021

(30) Foreign Application Priority Data

Jul. 31, 2019 (DE) .......................... 102019211447.4

(51) Int. Cl.
  *B23P 15/00* (2006.01)
  *B23K 26/352* (2014.01)
  (Continued)

(52) U.S. Cl.
  CPC .......... *B23P 15/003* (2013.01); *B23K 26/352* (2015.10); *F16C 29/04* (2013.01);
  (Continued)

(58) Field of Classification Search
  CPC ............. B23P 15/003; Y10T 29/49641; Y10T 29/49636; Y10T 29/4975
  See application file for complete search history.

(56) References Cited

U.S. PATENT DOCUMENTS

| | | | |
|---|---|---|---|
| 5,142,778 A | * | 9/1992 | Smolinski ................ C21D 1/00 228/119 |
| 5,228,324 A | * | 7/1993 | Frackiewicz ............ C21D 9/46 72/342.1 |

(Continued)

FOREIGN PATENT DOCUMENTS

| | | |
|---|---|---|
| DE | 10 2014 204 073 A1 | 9/2015 |
| EP | 0 971 140 A1 | 1/2000 |

(Continued)

OTHER PUBLICATIONS

"Laser scanning", Wikipedia, retrieved from internet: Jun. 30, 2020, https://de.wikipedia.org/w/index.php?title=Laserscanning&oldid=200870799 (14 pages).

*Primary Examiner* — Sarang Afzali
(74) *Attorney, Agent, or Firm* — Maginot, Moore & Beck LLP (57) ABSTRACT

A method includes producing a preform of a guide rail from steel, putting the preform in a holding device so that the preform is held fixed in position, analyzing the preform held in the holding device, a deviation from a straight shape being measured at a plurality of locations along the longitudinal axis. The method further includes irradiating the preform held in the holding device with a laser beam, a surface section being irradiated with the laser beam along the longitudinal axis at a plurality of locations, respectively on one of two side surfaces facing in opposite directions in relation to the first transverse axis, in such a way that it is heated into the plastic range.

14 Claims, 4 Drawing Sheets

(51) Int. Cl.
*G01B 5/20* (2006.01)
*F16C 29/04* (2006.01)
*G01B 9/02* (2022.01)
*G01B 11/26* (2006.01)

(52) U.S. Cl.
CPC ............... *G01B 5/20* (2013.01); *G01B 9/02* (2013.01); *G01B 11/26* (2013.01); *Y10T 29/49641* (2015.01)

(56) References Cited

U.S. PATENT DOCUMENTS

| | | | |
|---|---|---|---|
| 10,128,197 B2* | 11/2018 | Ranish | H01J 37/32899 |
| 2015/0352794 A1* | 12/2015 | Nguyen | B22F 10/20 |
| | | | 700/98 |
| 2016/0016255 A1* | 1/2016 | Bruck | F01D 5/141 |
| | | | 219/121.76 |

FOREIGN PATENT DOCUMENTS

| | | | | |
|---|---|---|---|---|
| JP | S5429868 A | * | 3/1979 | |
| JP | S56058921 A | * | 5/1981 | |
| JP | 58218388 A | * | 12/1983 | ............ B23K 26/03 |
| JP | 2001068429 A | * | 3/2001 | |

* cited by examiner

METHOD FOR THE LASER ALIGNMENT OF GUIDE RAILS

This application claims priority under 35 U.S.C. § 119 to application no. DE 10 2019 211 447.4, filed on Jul. 31, 2019 in Germany, the disclosure of which is incorporated herein by reference in its entirety.

The disclosure relates to a method for producing a guide rail for a linear rolling bearing.

BACKGROUND

A linear rolling bearing is known, for example, from EP 971 140 B1. The corresponding preform of the guide rail may, for example, be produced according to the method of DE 10 2014 204 073 A1. It may in this case happen that the guide rail is not entirely straight at the end despite the highly accurate grinding processing. Conventionally, so-called 3-point alignment is applied in order to achieve the desired straightness of the guide rail. In this case, the guide rail is placed on two supports separated from one another in the direction of the longitudinal axis. Between the supports, a compressive force is applied to the guide rail, which is supported by means of the supports. The magnitude of the compressive force is in this case selected in such a way that plastic flexion of the guide rail does not take place. A disadvantage of this method is that it is difficult to automate. Rather, it is carried out manually, the corresponding worker selecting the suitable support points and the suitable compressive force on the basis of their experience.

SUMMARY

One advantage of the present disclosure is that the corresponding method can be automated easily.

According to the disclosure, a method is provided for producing a guide rail for a linear rolling bearing, which comprises the following steps, which are carried out successively in the order specified:

a) producing a preform of a guide rail from steel, the preform comprising at least one running track which extends parallel to a longitudinal axis and is hardened and optionally ground, the preform optionally being provided with a plurality of fastening bores which are arranged distributed along the longitudinal axis, these being oriented transversely to the longitudinal axis;

b) putting the preform in a holding device so that the preform is held fixed in position;

c) analyzing the preform held in the holding device, a deviation from a straight shape, particularly in the direction of a first transverse axis which is oriented perpendicularly to the longitudinal axis, being measured at a plurality of positions along the longitudinal axis;

d) irradiating the preform held in the holding device with a laser beam, a surface section being irradiated with the laser beam along the longitudinal axis at a plurality of locations, respectively on one of two side surfaces facing in opposite directions in relation to the first transverse axis, in such a way that it is heated into the plastic range, the surface section being arranged outside the at least one running track, the side surface to be irradiated and the size of the surface section being selected according to the result of said analysis.

In the scope of step b), care is preferably taken that the least possible elastic deformation of the guide rail, which influences the analysis according to step c), takes place. Insofar as such deformation is unavoidable, the holding device is preferably configured in such a way that this deformation can be compensated for by computation. This will be discussed in more detail below. The preform according to step a) may, for example, be produced according to DE 10 2014 204 073 A1, in which case the method described there as prior art may also be used. In the scope of step d), use is made inter alia of the fact that the irradiated surface section cools relatively rapidly after the laser beam is turned off because the heat energy is dissipated into the remaining material of the preform, where it causes only a small temperature increase. Stresses are consequently created in the guide rail, which lead to precisely the desired shape change of the preform. The irradiation outside the running track has the effect that the hardness and the accurate produced shape of the running track are not detrimentally influenced.

Advantageous refinements and improvements of the disclosed method are specified below.

It may be provided that steps c) and d) are carried out correspondingly for a second transverse axis, the second transverse axis being oriented perpendicularly to the first transverse axis and to the longitudinal axis. In this way, it is possible to correct flexion of the preform in relation to two mutually orthogonal directions, i.e. arbitrary flexion.

It may be provided that the position of the preform in the holding device remains unchanged in relation to the first and second transverse axes during the processing. It is conceivable to clamp the preform again in between, in order to be able to configure the corresponding device particularly simply. As already indicated above, however, the placing of the preform in the holding device is preferably carried out particularly carefully so that the desired method outcome is reliably achieved. This step should therefore be carried out only once so that the method is particularly economical overall.

It may be provided that the preform is supported pointwise in the holding device on at least two supports, the elastic deformation of the preform resulting therefrom because of its own weight being taken into account during the analysis in step c. Preferably, the preform is supported on precisely two supports. In this way, although inherently undesired elastic deformation of the preform is caused by its own weight, the extent of this deformation may nevertheless be determined particularly accurately by computation. Accordingly, compensation is easily possible. The pointwise mounting is furthermore particularly reliably reproducible, so that the flexion of the preform can be corrected particularly accurately.

It may be provided that the preform is turned through 90° in relation to the longitudinal axis between the processing in relation to the first and second transverse axes. As already mentioned above, in this way the device for carrying out the method may be configured particularly simply.

It may be provided that the preform is supported at least linearly over its entire length in the holding device. The supporting is preferably carried out parallel to the longitudinal axis. The first transverse axis is preferably oriented perpendicularly to the longitudinal axis and perpendicularly to the direction of the force of gravity. Correspondingly, the force of gravity causes precisely no elastic deformation in the direction of the first transverse axis. The linear supporting, or the longitudinal axis, is preferably oriented perpendicularly to the direction of the force of gravity.

It may be provided that the irradiated surface sections are elongately configured, a longer side being oriented parallel to the longitudinal axis. Such irradiation causes only flexion of the guide rail, undesired torsion of the guide rail in relation to the longitudinal axis not taking place. The longer side is preferably configured to be straight. The shorter side may be configured to be straight, so that a rectangular surface section is obtained overall. The corresponding corners are preferably rounded. The short side may be circularly shaped, so that a surface section in the shape of an elongate hole is obtained overall.

It may be provided that the irradiated surface sections are elongately configured, a longer side being oriented with an inclination with respect to the longitudinal axis. As a result, undesired torsion of the preform of the guide rail can be corrected. In conventional 3-point alignment, warping of the preform in relation to the longitudinal axis cannot be corrected. The corresponding inclination angle of the longer side with respect to the longitudinal axis may, for example, be between 10° and 45°, it preferably being selected on the basis of the warping of the preform in relation to the longitudinal axis as determined in the scope of the analysis. Preferably, the preform is analyzed again after the torsion correction in order to correct its flexion with optimal accuracy. The additional flexion of the preform, possibly introduced in the scope of the torsion correction, does not therefore cause a problem.

It may be provided that steps c and d are carried out repeatedly several times in each case for the first and/or second transverse direction until the deviation measured in step c from the straight shape falls below a predetermined limit value. In this way, a particularly straight guide rail may be achieved.

It may be provided that the various irradiated surface sections are selected in such a way that they do not overlap. This avoids the effect of irradiation carried out later negating the effect of irradiation carried out earlier. In this way, the establishing of the surface sections to be irradiated is substantially simplified.

It may be provided that the depth at which a heating into the plastic range takes place is between 0.1 mm and 1.5 mm. In principle, values of between 0.01 mm and 5.0 mm are achievable with a conventional laser beam generating device. Tests by the Applicant have, however, revealed that a particularly highly reproducible method outcome is obtained when using the proposed range.

It may be provided that the preform is provided with a plurality of fastening bores, which respectively extend parallel to the first transverse direction. According to this definition, the alignment processing on the bottom and top surfaces takes place before the alignment processing on the side surfaces between the running tracks or the abutment surface. Preferably, the fastening bores pass through the preform. The fastening bores are preferably arranged distributed uniformly along the longitudinal axis.

It may be provided that the irradiated surface sections are arranged between two respectively directly neighboring fastening bores during the processing in relation to the first transverse direction. It is difficult to predict the effect of the irradiation in the region of the fastening bores. The establishing of the surface sections to be irradiated is therefore simplified by the proposed arrangement of the surface sections.

It goes without saying that the features mentioned above and those yet to be explained below may be used not only in the combination respectively indicated, but also in other combinations or individually, without departing from the scope of the present disclosure.

BRIEF DESCRIPTION OF THE DRAWINGS

The disclosure is explained in more detail below with the aid of the appended drawings in which.

DETAILED DESCRIPTION

Figure 1:
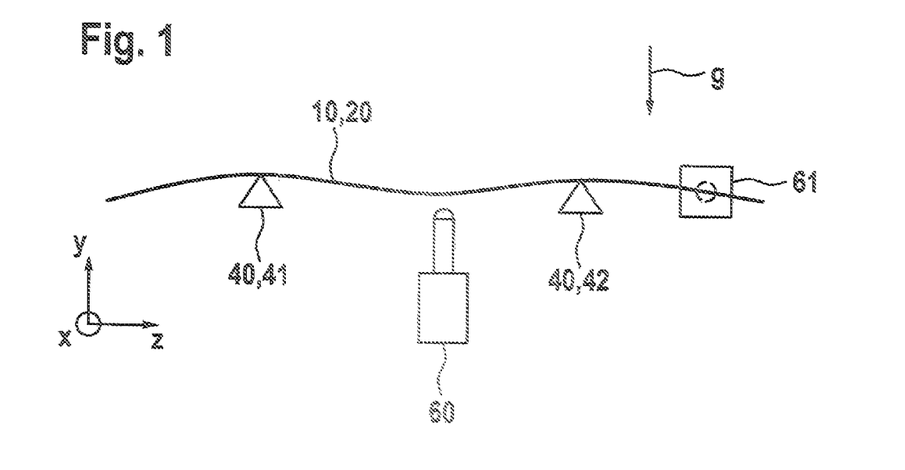
FIG. 1 shows a rough schematic side view of the preform placed in the holding device.

FIG. 1 shows a rough schematic side view of the preform 20 placed in the holding device 40. The holding device 40 comprises a first and a second support 41; 42, which are spaced apart from one another in the direction of the longitudinal axis z. The two corresponding pointwise supporting locations define the longitudinal axis z. The preform 20 is placed on the first and second supports 41; 42, while flexing approximately as represented here because of the effect of the force of gravity g, the flexion being represented exaggeratedly. The spacing of the two supports 41; 42 is preferably selected on the basis of the length of the preform 20 to be processed, in such a way that the least possible elastic deformation occurs because of the force of gravity. The preform 20 is preferably firmly clamped on the two supports 41; 42 so that it cannot move. The clamping is preferably configured in such a way that, apart from the pointwise supporting, no further impeding of the flexion of the preform 20 because of the force of gravity g takes place. The corresponding computational correction of the flexion as explained below is therefore possible in a straightforward way.

The measuring devices 60 and 61 may, for example, be mechanical sampling heads or laser interferometers. The measuring devices 60 and 61 are displaceable parallel to the longitudinal axis z, the corresponding guide (not represented) being oriented very accurately with respect to the longitudinal axis z, so that deviations from the straight shape can be measured accurately with the measuring devices 60 and 61. The measuring device 61 is tilted through 90° relative to the measuring device 60. The first measuring device 60 in the present case measures a distance from the longitudinal axis z along a first transverse direction x, which is oriented perpendicularly to the longitudinal axis z. The second measuring device 61 in the present case measures a distance of a second transverse direction y, which is oriented perpendicularly to the longitudinal axis z and perpendicularly to the first transverse direction x. In the area spanned by measuring devices 60 and 61 along the z longitudinal axis, the attitude and position of the guide rail 10 are also determined besides the straightness. The measuring devices 60 and 61 detect the attitude and position of optionally present fastening bores 18, which are arranged distributed along the longitudinal axis z, these being oriented transversely to the longitudinal axis.

In the scope of the method according to the disclosure, the deformation of the guide rail 10 is determined by the measuring devices 60 and 61. The measurement results obtained are the basis of the subsequent irradiations.

The irradiation is preferably carried out at the locations where the curvature, i.e. the second derivative of the measured deformation, is greatest. The irradiation is in this case preferably carried out on the side of the guide rail which is convexly curved. For the size and the arrangement of the regions to be irradiated, the cross-sectional shape of the present guide rail is preferably taken into account, since in particular its second moment of area has a crucial influence on the deformation of the guide rail which can be achieved by the irradiation.

Figure 2:
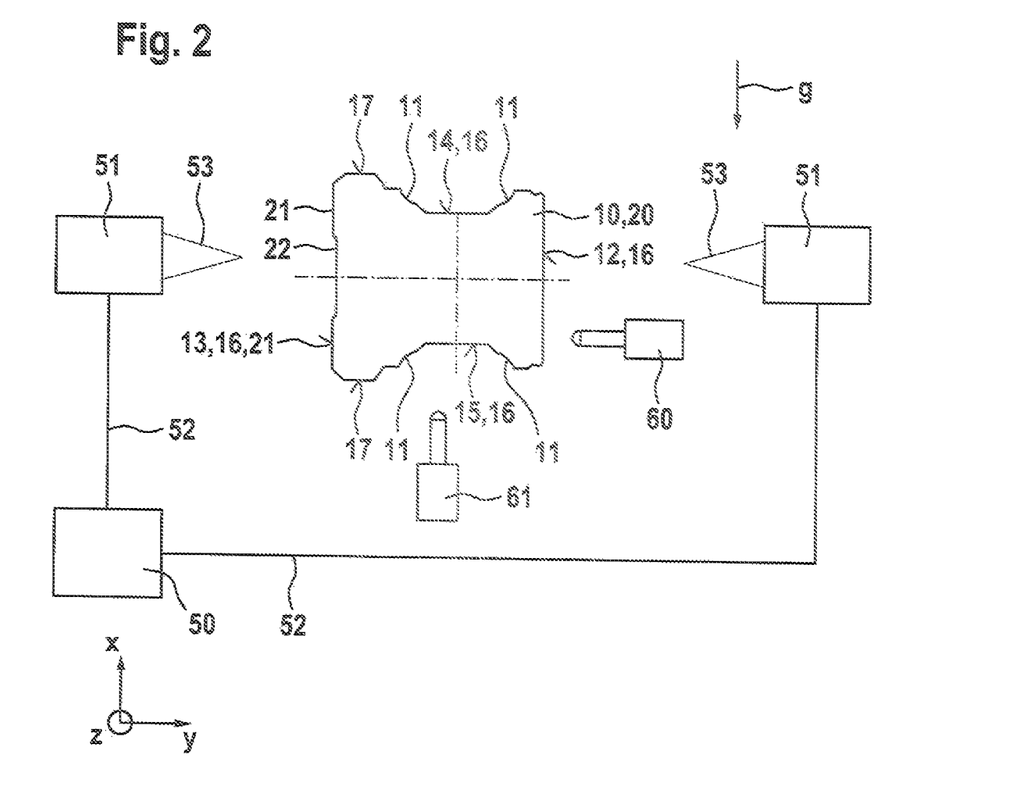
FIG. 2 shows a rough schematic cross section of the preform during the irradiation in relation to the first transverse axis.
Figure 3:
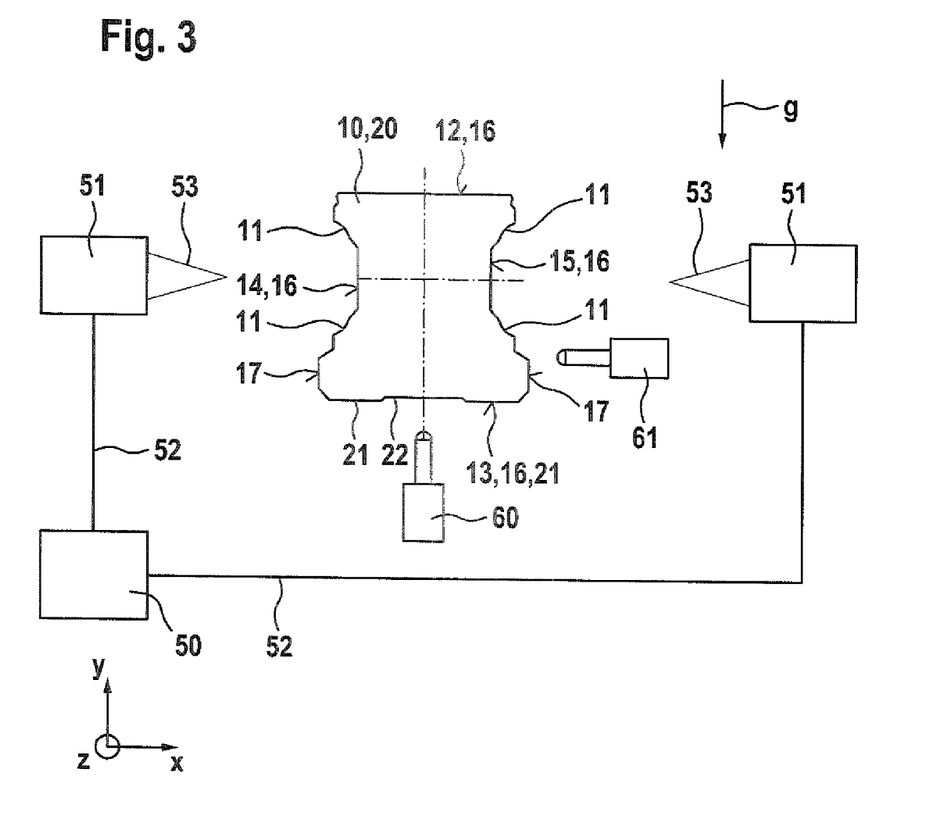
FIG. 3 shows a rough schematic cross section of the preform during the irradiation in relation to the second transverse axis.

FIG. 2 shows a rough schematic cross section of the preform 20 during the irradiation in relation to the first transverse axis x. FIG. 3 shows a rough schematic cross section of the preform 20 during the irradiation in relation to the second transverse axis y. The corresponding 90° rotation may, as represented, be achieved by the preform 20 being rotated through 90° with respect to the longitudinal axis z. Preferably, the clamping and therefore the position of the preform 20 remain the same during the two processing operations, merely the arrangement of the laser deflection devices 51 being altered. Preferably, separate laser deflection devices 51 are respectively used for the two processing directions.

The surface sections according to the disclosure (No. 30 in FIG. 4) are produced with the aid of a (roughly schematically represented) laser beam 53. The laser beam 53 is generated by a laser beam generating device 50. Preferably, there is only a single laser beam generating device 50 for all the side surfaces 16 of the preform 20, the laser beam of which is guided toward the corresponding side surface 16 according to the desired bearing of the surface section. The laser beam generating device 50 is preferably a diode laser, which preferably has a radiation power of from 6 to 8 kW.

It goes without saying that the individual surface sections (No. 30 in FIG. 4) are significantly larger in area than the area which the laser beam 53 irradiates at one time. Correspondingly, laser beam deflecting devices 51 are provided, with which the laser point, or spot, can be displaced along the surface of the guide rail so that it gradually sweeps over the entire surface section. The laser beam deflecting devices 51 are also referred to as laser scanners (https://de.wikipedia.org/wiki/Laserscanning). They comprise, for example, motor-movable mirrors by means of which the laser beam can be deflected. The individual laser beam deflecting devices 51 are preferably movably guided along the longitudinal axis z. The laser beam deflecting devices 51 are preferably respectively connected to the laser beam generating device 50 by means of a light waveguide 52.

The cross-sectional shape of the guide rail, or of the corresponding preform 20, may be seen in FIGS. 2 and 3. The guide rail has a top and bottom surface 12; 13, which are spaced apart from one another in the direction of the first transverse axis x, and they are arranged substantially parallel to one another and perpendicularly to the first transverse axis x. The bottom surface 13 in the present case has two supporting regions 21, which are spaced apart from one another and are arranged in a plane, a groove 22, which is set back in relation to said plane, being arranged between them. The first and second running track surfaces 14; 15 are spaced apart from one another in the direction of the second transverse axis y. Two running tracks 11, which respectively extend parallel to the longitudinal axis z, are in the present case respectively arranged on the running track surface 14; 15. The running tracks 11 are in the present case adapted to spherical rolling bodies, and are therefore configured to be round. There may, however, also be planar running tracks for cylindrical rolling bodies. The number of running tracks 11 is substantially arbitrarily selectable. A planar abutment surface 17, which is arranged next to the bottom surface 13 and is oriented perpendicularly thereto, is respectively provided on the running track surfaces 14; 15. The analysis of the preform 20 with the measuring devices (No. 60 and 61 in FIG. 1) is preferably carried out on the running tracks 11, the abutment surface 17 and/or a supporting region 21 of the bottom surface 13, since said surfaces can be produced particularly accurately by means of grinding processing or are in a drawn state.

In the holding device 40 according to FIG. 1, the preform 20 is preferably supported by means of the supporting regions 21 on the first and second supports, so that it is arranged as represented in FIG. 3 in relation to the force of gravity g.

A side surface 16 according to the method according to the disclosure may be the first or the second running track surface 14; 15, the top surface 12 or the bottom surface 13. On the running track surfaces 14; 15, in particular the area between the running tracks 11, the abutment surface 17, is irradiated. The irradiation on the bottom surface 13 is preferably carried out in the region of the groove 22, although it may also relate to the supporting region of the bottom surface 21.

Figure 4:
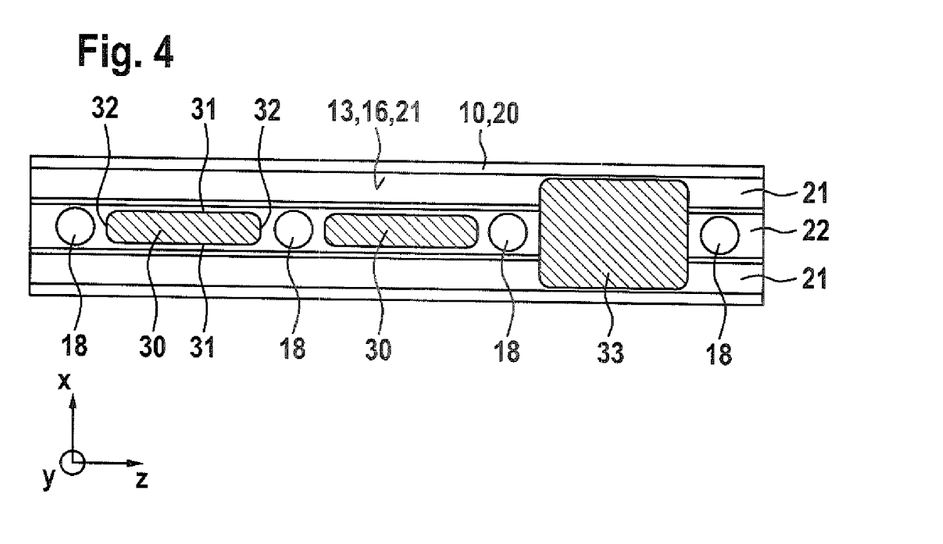
FIG. 4 shows a view of the bottom side of a fully processed guide rail.

FIG. 4 shows a view of the bottom side 13 of an irradiated guide rail 10. The two supporting regions 21 and the groove 22 arranged between them can be seen. The irradiated surface sections 30 are arranged fully in the region of the groove 22. They in this case preferably occupy substantially the entire width of the groove 22 in the direction of the second transverse axis y. They may also include the supporting region of the bottom surface 21, as is represented by the reference 33. In the direction of the longitudinal axis z, the surface sections 30 and 33 are arranged between the fastening bores 18, which in the present case pass fully through the guide rail 10 in the direction of the first transverse axis x.

The surface sections 30 and 33 are respectively configured as an elongate rectangle, the longer side 31 extending parallel to the longitudinal axis z. The shorter side 32 extends parallel to the second transverse axis y. The corners of the rectangle are preferably rounded.

FIG. 4 shows one conceivable example of an arrangement of surface sections 30 and 33. In the scope of the method according to the disclosure, in particular the length of the longer side 31 is varied, the maximum possible length between the fastening bores 18 being shown in FIG. 4. If the surface sections 30 and 33 are shorter than are shown in FIG. 4, their position between the fastening bores 18 may furthermore be varied.

On the top surface (No. 12 in FIG. 2), the surface sections may be arranged in a similar way. Their width in the direction of the second transverse axis could be configured differently there, although it is preferably configured in the same way. On the two surfaces between the running tracks or on the abutment surface 17, the available width in the direction of the first transverse axis x is preferably used substantially fully.

Figure 5:
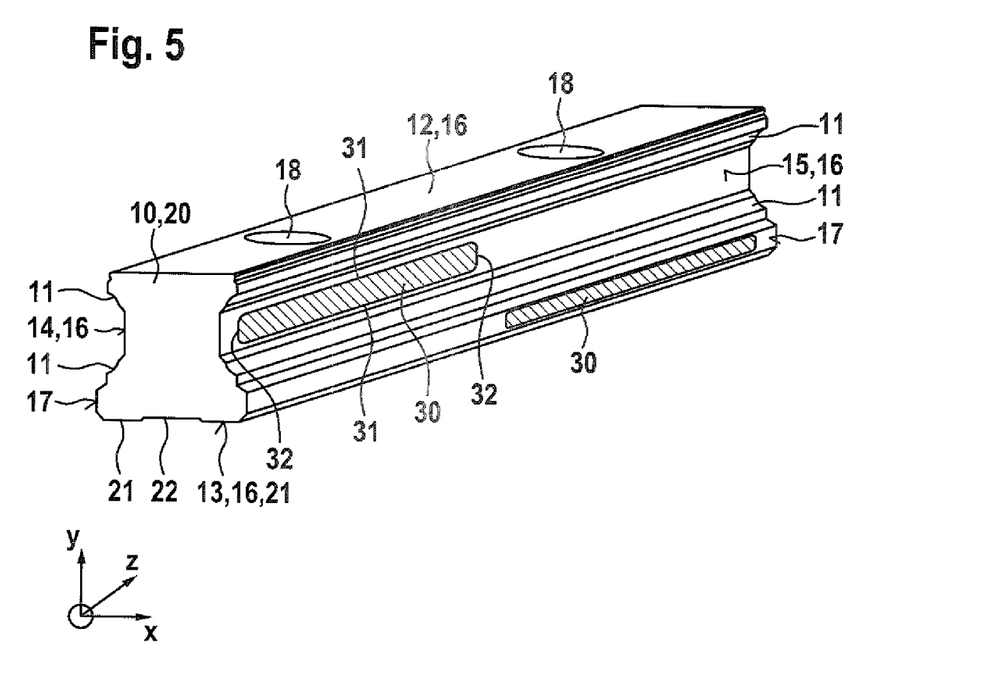
FIG. 5 shows a perspective view of a fully processed side surface of a guide rail.

FIG. 5 shows a perspective view of a fully processed side surface of a guide rail. In particular, the irradiated surface sections on the second running track surface 15 may be seen. These are arranged between the running tracks 11 or on the abutment surface 17.

Figure 6:
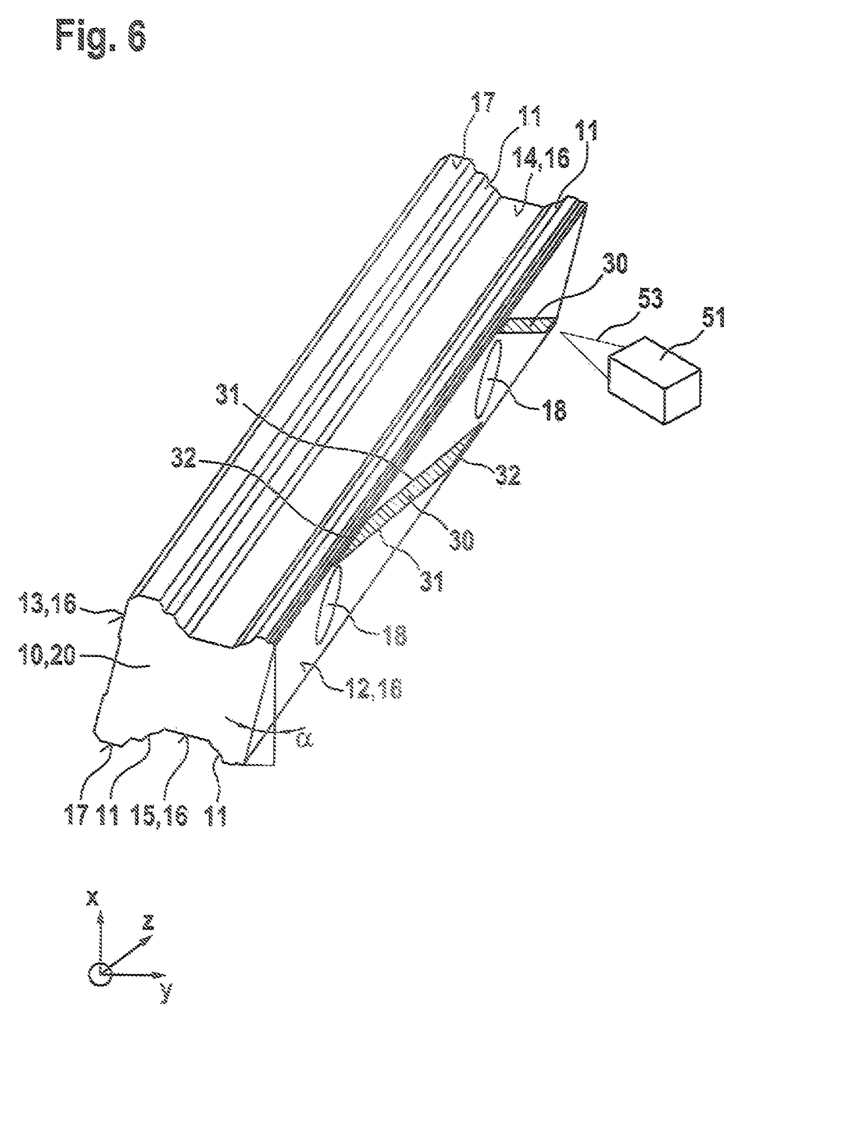
FIG. 6 shows a perspective view of a further fully processed guide rail.

FIG. 6 shows a perspective view of a further guide rail 10. Except for the differences explained below, this embodiment is identical to the embodiment shown in FIGS. 2 to 5, so that in this regard reference is made to the comments relating to said figures. In FIGS. 2 to 6, parts which are the same or which correspond to one another are denoted by the same references.

The surface sections 30 are likewise elongately configured, the longer side 31 now being arranged with an inclination with respect to the longitudinal axis z. As a result of this arrangement, warping of the guide rail 10 in relation to the longitudinal axis z can be corrected. In order to measure such warping, the angle of the first transverse axis x and of the second transverse axis y (warp angle $\alpha$, see FIG. 5) of the supporting region of the bottom surface 21 is determined at defined positions along the longitudinal axis z and the warping is calculated therefrom. In the case of an unwarped guide rail 10, the warp angle would have to be a 0°.

The two surface sections 30 represented in FIG. 5 differ in respect of their angle of inclination with respect to the longitudinal axis z. The corresponding preform was accordingly warped differently at the two locations with respect to the longitudinal axis z, the laser-aligned guide rail 10 no longer being warped. Said angle of inclination is preferably selected on the basis of the result of the measurement.

REFERENCE NUMERALS x first transverse axis
y second transverse axis
z longitudinal axis
g direction of the force of gravity
$\alpha$ warp angle
10 guide rail
10' guide rail (further embodiment)
11 running track
12 top surface
13 bottom surface
14 first running track surface
15 second running track surface
16 side surface
17 abutment surface
18 fastening bore
20 preform
21 supporting region of the bottom surface
22 groove of the bottom surface
30 surface section
31 longer side
32 shorter side
33 surface section in the groove and the supporting region of the bottom surface
40 holding device
41 first support
42 second support
50 laser beam generating device
51 laser beam deflecting device
52 light waveguide
53 laser beam
60 first measuring device
61 second measuring device

The invention claimed is:
1. A method for producing a guide rail for a linear rolling bearing, comprising:
producing a preform of a guide rail from steel, the preform comprising at least one running track which extends parallel to a longitudinal axis and is hardened;
placing the preform in a holding device so that the preform is held fixed in position; and
processing the preform in relation to a first transverse axis, which is oriented perpendicularly to the longitudinal axis, the processing in relation to the first transverse axis comprising:
analyzing the preform held in the holding device so as to measure a deviation from a straight shape in a direction of the first transverse axis at a first plurality of locations along the longitudinal axis; and
after analyzing the preform to measure the deviation in the direction of the first transverse axis, irradiating a first surface section of the preform held in the holding device with a laser beam along the longitudinal axis at a second plurality of locations, respectively, on one of two first side surfaces that face in opposite directions in relation to the first transverse axis, in such a way that the first surface section is heated into a plastic range, wherein the first surface section is arranged outside the at least one running track, and the one first side surface and a size of the first surface section are selected according to results of said analysis of the preform.

2. The method according to claim 1, further comprising: processing the preform in relation to a second transverse axis, which is oriented perpendicularly to the first transverse axis and to the longitudinal axis, the processing in relation to the second transverse axis comprising:
analyzing the preform so as to measure a deviation from a straight shape in a direction of the second transverse axis at a third plurality of locations along the longitudinal axis; and
after analyzing the preform to measure the deviation in the direction of the second transverse axis, irradiating a second surface section of the preform with the laser beam at a fourth plurality of locations along the longitudinal axis on one of two second side surfaces that face in opposite directions in relation to the second transverse axis in such a way that the second surface section is heated into the plastic range, wherein the second surface section is arranged outside the at least one running track, and the one second side surface and a size of the second surface section are selected according to the results of the analysis of the preform to measure the deviation in the direction of the second transverse axis.

3. The method according to claim 2, wherein the position of the preform in the holding device remains unchanged in relation to the first and second transverse axes during the processing in relation to the first and second transverse axes.

4. The method according to claim 3, wherein:
the placing of the preform includes supporting the preform pointwise in the holding device on at least two supports; and
the analysis of the preform to measure the deviation in the direction of the first transverse axis and the analysis of the preform to measure the deviation in the direction of the second transverse axis include accounting for elastic deformation of the preform because of the weight of the preform resulting from the supporting of the preform.

5. The method according to claim 2, further comprising:
turning the preform through 90° in relation to the longitudinal axis between the processing in relation to the first and second transverse axes.

6. The method according to claim 5, wherein the preform is supported at least linearly in the holding device over an entire length of the preform.

7. The method according to claim 2, wherein the irradiated first and second surface sections are elongately shaped, having a longer side oriented parallel to the longitudinal axis.

8. The method according to claim 2, wherein the irradiated first and second surface sections are elongately shaped, having a longer side oriented with an inclination with respect to the longitudinal axis.

9. The method according to claim 2, wherein the analyzing and irradiating of the preform are carried out repeatedly several times for at least one of the first transverse axis and the second transverse axis until the deviation measured in the analysis from the straight shape is below a predetermined limit value.

10. The method according to claim 9, wherein the irradiated surface sections are selected in such a way that the irradiated surface sections do not overlap.

11. The method according to claim 1, wherein a depth of the heating into the plastic range takes place is between 0.1 mm and 1.5 mm.

12. The method according to claim 1, wherein the preform includes a plurality of fastening bores, which respectively extend parallel to the first transverse axis.

13. The method according to claim 12, wherein the irradiated first surface section is arranged between two respectively directly neighboring fastening bores of the plurality of fastening bores during the processing in relation to the first transverse axis.

14. The method according to claim 1, wherein the preform defines a plurality of fastening bores which are arranged distributed along the longitudinal axis, the plurality of fastening bores being oriented transversely to the longitudinal axis.

* * * * *